United States Patent
Hedo et al.

(10) Patent No.: US 7,278,455 B2
(45) Date of Patent: Oct. 9, 2007

(54) ASYMMETRICAL PNEUMATIC RUN-FLAT TIRE

(75) Inventors: Marc Hedo, Colmar-Berg (LU); Johan Peter Dahlberg, Luxembourg (LU); Walter Dale Allen, Akron, OH (US); Laurent Luigi Domenico Colantonio, Bastogne (BE); Filomeno Gennaro Corvasce, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 147 days.

(21) Appl. No.: 11/017,123

(22) Filed: Dec. 20, 2004

(65) Prior Publication Data

US 2006/0130951 A1 Jun. 22, 2006

(51) Int. Cl.
- B60C 17/00 (2006.01)
- B60C 3/06 (2006.01)
- B60C 11/00 (2006.01)

(52) U.S. Cl. .................. 152/209.8; 152/455; 152/456; 152/517

(58) Field of Classification Search ............. 152/209.8, 152/209.9, 455, 456, 517
See application file for complete search history.

(56) References Cited

U.S. PATENT DOCUMENTS

| | | | |
|---|---|---|---|
| 4,203,481 A | 5/1980 | Ranik, Jr. | |
| 4,830,077 A * | 5/1989 | Goto et al. | 152/209.8 |
| 4,905,748 A | 3/1990 | Kukimoto et al. | |
| 5,205,978 A | 4/1993 | Ushikubo et al. | |
| 5,386,863 A | 2/1995 | Hashimura et al. | |
| 5,591,282 A | 1/1997 | Weber et al. | |
| 5,693,160 A | 12/1997 | Kawabata et al. | |
| 5,735,979 A | 4/1998 | Secondari | |
| 6,508,284 B1 | 1/2003 | Swift et al. | |
| 6,758,928 B2 | 7/2004 | Hubbell, Jr. et al. | |
| 6,786,260 B2 | 9/2004 | Niwa et al. | |
| 6,843,291 B1 * | 1/2005 | Gaudin | 152/209.8 |

FOREIGN PATENT DOCUMENTS

| | | | |
|---|---|---|---|
| EP | 0 755 808 | 7/1996 | |
| EP | 0 820 884 | 7/1996 | |
| GB | 1115834 * | 5/1968 | 152/455 |
| JP | 04005103 A * | 1/1992 | |
| JP | 04271902 A * | 9/1992 | |
| JP | 06135204 A * | 5/1994 | |
| WO | 01/02195 | 1/2001 | |
| WO | W)-01/34412 A2 * | 5/2001 | |
| WO | WO-03/029033 A1 * | 4/2003 | |

OTHER PUBLICATIONS

European Search Report, completed Mar. 30, 2006.
Patent Abstracts of Japan, Publication No. 04271902, Publication Date Sep. 28, 1992.

* cited by examiner

Primary Examiner—Adrienne C. Johnstone
(74) Attorney, Agent, or Firm—Nancy T. Krawczyk (57) ABSTRACT

A pneumatic tire is capable of operation during underinflated condition and the construction of sidewalls are configured to compensate for negative cambers acting upon the tire. The inboard side of the tire is softened in comparison to the outboard side of the tire. This is achieved by either forming an asymmetrical tire in either the tire profile or the internal construction.

12 Claims, 5 Drawing Sheets

ASYMMETRICAL PNEUMATIC RUN-FLAT TIRE

FIELD OF THE INVENTION

The present invention is directed to a pneumatic tire. More specifically, the present invention is directed towards a pneumatic tire capable of continued use in underinflated conditions.

BACKGROUND OF THE INVENTION

When an inflated tire carries a load, the major part of the load is supported by the air inside the tire. A lesser, but not negligible part, is carried by the tire structure itself. When the tire is operated in underinflated conditions, the air ceases to contribute to load carrying, and the entire load rests on the tire structure. Self-supporting tires are designed with a reinforced structure able to carry the entire load under deflated/underinflated conditions. A major contributor in obtaining the required structure stiffness is the sidewall, whose bending properties largely influence the tire's run-flat potential, and, more particularly the reinforcement of the sidewall that allows the tire to carry a greater load.

Through the use of high wheel camber and toe angles, car suspensions are often designed in such a way that the load carried by a tire is not equally distributed between the inner and outer side of the tire. Given the fact that both sides of a tire are generally equal, this causes an asymmetric loading of the footprint leading to a side-to-side non-uniform shape that can be detrimental to the tire performance. This becomes particularly important in the case of a deflated self-supporting tire. In other words, it is inherent to current design practice that one of the two sides of a self-supporting tire is generally overdesigned in terms of bending stiffness.

To offset the positive camber of a tire, it has been proposed by Ranik, Jr in U.S. Pat. No. 4,203,481 to increase the bulk of the sidewall insert on the side of the tire designed to be mounted on the inside of the vehicle by at least 25% over the bulk of the insert on the opposing side of the tire. Ranik also teaches the use of an asymmetric rim with the asymmetric self-supporting tire.

The present application shows alternative ways to create a desired asymmetry in a cured tire to achieve a rebalancing for the asymmetric loading condition during partly or fully deflated service conditions.

SUMMARY OF THE INVENTION

The goal of the present invention is an asymmetrical self-supporting pneumatic tire. Different ways are shown to obtain a tire with an asymmetrical behavior, capable of compensating for the asymmetrical effects of camber. Ultimately, all solutions aim at creating a difference in stiffness between the two sides of a tire. Only when the cambered side is less stiff than the opposite side, a balanced load distribution can be achieved on a suspension with a fixed camber. The asymmetrical effect being the more evident during underinflated operation, runflat durability can be significantly improved on a cambered suspension while inflated properties remain unchanged.

Disclosed is a method of manufacturing an asymmetrical run-flat tire. The method includes the step of building a symmetrical green tire, the green tire having an equatorial plane (EP) and comprising a tread, a pair of opposing beads, at least one carcass reinforcing ply, a belt structure located radially outward of the carcass reinforcing ply, and a sidewall insert axially inward of at least one of the carcass reinforcing plies in a sidewall portion of the tire. The symmetrical green tire is cured in a mold having an asymmetrical configuration to form an asymmetrical cured tire. The cured tire has a pair of beads symmetrically distanced from the equatorial plane (EP) of the tire. The tread on each side of the equatorial plane of the tire has different radius of curvature and different widths, the widths being measured perpendicular to the equatorial plane to a line tangent to the maximum width of the belt structure.

In one aspect of the disclosed method, each sidewall of the cured tire has a maximum width, as measured from the tire equatorial plane (EP) to the radially outer surface of the tire sidewall, and one sidewall has a width Ws greater than the width Ws' of the opposing sidewall.

In another aspect of the disclosed method, one sidewall of the asymmetric cured tire has a width Ws in the range of 100 to 110% of the width Ws' of the opposing sidewall.

In another aspect of the disclosed method, the symmetrical green tire is cured such that each sidewall of the cured tire has a maximum width, as measured from the tire equatorial plane to the radially outer surface of the tire sidewall, and the maximum width of one sidewall is radially outward of the maximum width of the opposing sidewall.

Also disclosed herein is an asymmetric run-flat pneumatic tire. The tire has an equatorial plane (EP), a pair of opposing bead portions, a pair of opposing sidewalls, at least one carcass reinforcing ply, a sidewall insert axially inward of at least one of the carcass reinforcing plies in each sidewall portion, and a belt structure located radially outward of the carcass reinforcing plies. The bead portions of the tire are symmetrically distanced from the equatorial plane (EP) of the tire. The tread on each side of the equatorial plane (EP) have different radii of curvature and different widths, the widths being measured perpendicular to the equatorial plane (EP) to a line tangent to the maximum width of the belt structure.

In one aspect of the disclosed tire, each sidewall of the tire has a maximum width, as measured from the tire equatorial plane to the radially outer surface of the tire sidewall, and one sidewall has a width Ws greater than the width Ws' of the opposing sidewall. Preferably, one sidewall has a width Ws in the range of 100 to 110% of the width Ws' of the opposing sidewall.

In another aspect of the disclosed tire, each sidewall of the tire has a maximum width, as measured from the tire equatorial plane (EP) to the radially outer surface of the tire sidewall. The maximum width of the one sidewall is radially outward of the maximum width of the opposing sidewall.

In another aspect of the disclosed invention, the tire is further characterized by the sidewall insert in one sidewall having different physical characteristics than the sidewall insert in the opposing sidewall.

In another aspect of the disclosed invention, the tire is further characterized by an additional reinforcing layer located in only one bead portion. The additional reinforcing layer may be a chipper, chafer, or flipper layer; being located inward of the turnup portions of the carcass reinforcing ply, outward of the turnup portion of the carcass reinforcing ply, along the outer surface of the bead, wrapped about the bead core, or adjacent to the bead apex. The additional reinforcing ply may be cord reinforced. Alternatively, the additional reinforcing layer may be a radial half carcass reinforcement ply wherein the half ply initiates in the tread region, under the belt structure, and extends into the bead region of the one sidewall, being turned about the bead core from either the axially inner side to the axially outer side or being turned about the bead core from the axially outer side to the axially inner side.

In another aspect of the invention, the tire is further characterized by one sidewall having two sidewall inserts and the opposing sidewall having only one sidewall insert.

In another aspect of the invention, the tire is further characterized by each bead portion comprising a bead core and an apex. The apex is located radially outward of the bead core and has a radially outward terminal point, wherein the terminal point of the apex in one bead portion is radially outward of the terminal point of the apex in the opposing bead portion. Alternatively, or in addition, the apex in one bead portion has different physical characteristics than the apex in the opposing bead portion.

Also disclosed is an asymmetric run-flat pneumatic tire. The asymmetric tire has an equatorial plane (EP), a symmetrical tread profile, a pair of opposing bead portions, a pair of opposing sidewalls, at least one carcass reinforcing ply, a sidewall insert axially inward of at least one of the carcass reinforcing plies in each sidewall portion, and a belt structure located radially outward of the carcass reinforcing plies. The tire asymmetry is formed by the presence of an additional reinforcing layer located in only one bead portion, but not present in the opposing bead portion.

In one aspect of this asymmetric tire, the additional reinforcing layer located in only one of the bead portion is selected from the following ply configuration of chafer, chipper, or flipper. The additional reinforcing layer may be cord reinforced. If so reinforced, the cords are inclined at angles in the range of 15° to 75° relative to the circumferential direction of the tire. Alternatively, the additional reinforcing layer may be a radial half carcass ply extending from beneath the belt structure to being turned up in the bead region.

In another aspect of this asymmetric tire, each bead portion is further comprised of a bead core and a bead apex. To further enhance the asymmetrical nature of the tire, either the bead apex in one bead portion or the sidewall insert in one sidewall has different physical characteristics than the bead apex or the sidewall insert in the opposing bead portion or sidewall.

In another aspect of the asymmetric tire, each bead portion is further comprised of a bead core and an apex, the apex being located radially outward of the bead core and having an radially outward terminal point. The terminal point of the apex in one bead portion is radially outward of the terminal point of the apex in the opposing bead portion.

In any of the disclosed embodiments and aspects, the various features which create an asymmetry to the tire may be combined with any other feature that creates an asymmetry to the tire.

Additionally, the tire sidewall may be marked to indicate which side of the tire is intended to be the outboard side of the tire so that, when mounting the tire on a negatively cambered suspension, the relatively stronger side of the tire is mounted as the outboard side of the tire.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. The structures employed basically the same components with variations in location or quantity thereby giving rise to the alternative constructions in which the inventive concept can be practiced.

Figure 1:
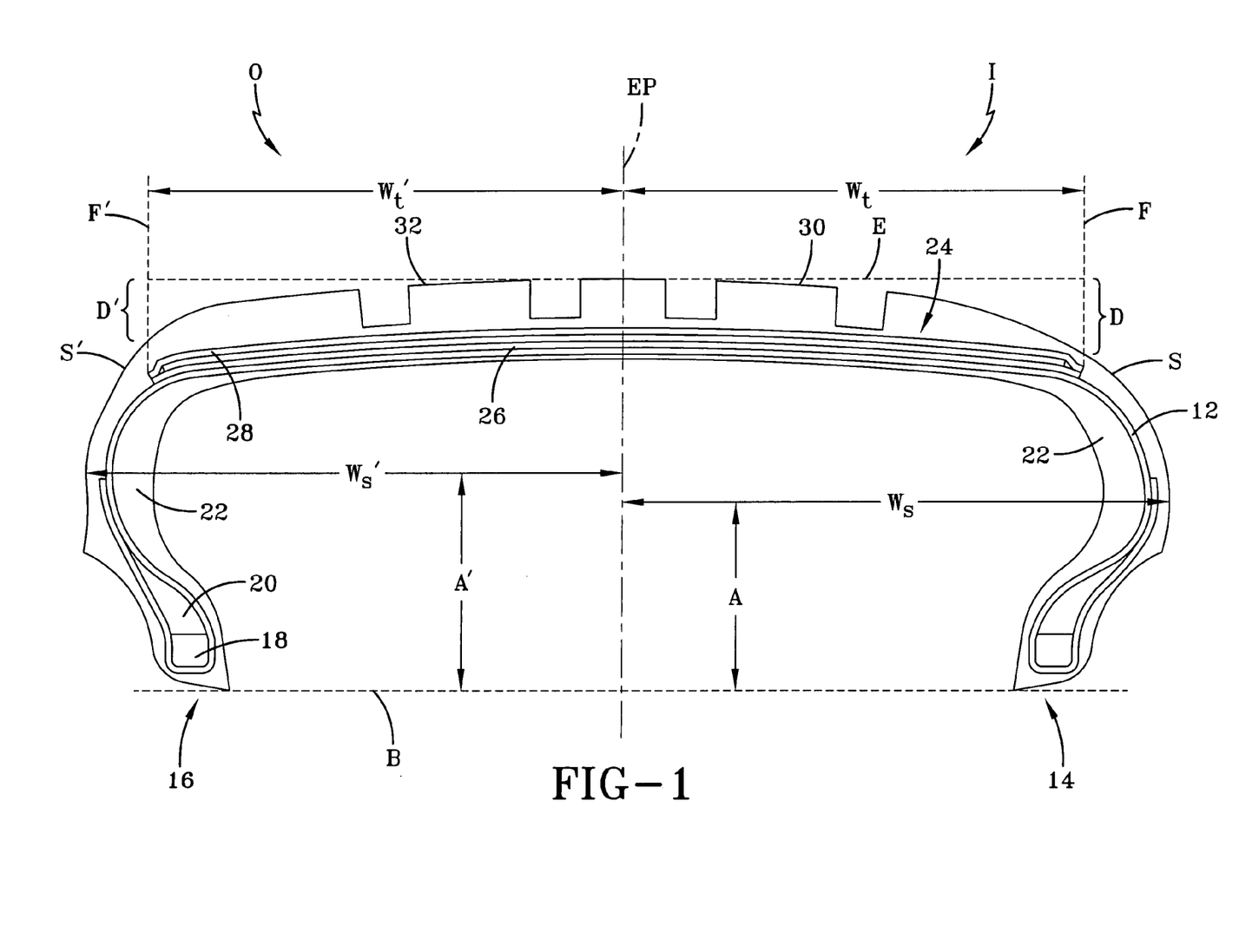
FIG. 1 is a cross section view of a tire.

FIG. 1 illustrates an asymmetrical pneumatic tire formed in accordance with the present invention. The tire is a molded tire, inflated to a standard operating pressure, but under no load. The pneumatic tire is a self-supporting tire, enabling limited operation of the tire during low-inflation conditions. The tire carcass has at least one reinforcing ply 12, the ply 12 extending from one bead area 14 of the tire to the opposing bead area 16. Both ends of the ply 12 are turned axially inward to axially outward about bead cores 18 and bead apexes 20. When the tire is formed of at least two reinforcing plies 12, the innermost reinforcing ply has terminal ends that extend past the radially outer ends of the bead apexes and the terminal ends of the outermost reinforcing ply; thereby enveloping the bead apexes 20 and other ply ends.

Axially inward of the reinforcing ply 12, and located in each sidewall region of the tire, is a sidewall insert 22. The inserts 22 are formed of elastomeric material and extend from the crown area, radially inward of the belt structure 24, to radially inward of the outermost terminal end of the bead apexes 20, overlapping the bead apexes 20. The elastomeric material of the inserts 22 is selected to provide the tire with support during underinflated operation of the tire.

In the crown area of the tire is a belt structure 24, located radially outward of the carcass structure. The belt structure 24 has at least two inclined, crossed cord plies 26. The cords in the belt plies 26 are inclined with respect to the circumferential direction and preferably, the cords in directly adjacent plies are inclined at similar but opposing angles to each other. Outward of the cross cord plies 26 may be at least one overlay ply 28. If employed in the tire, the overlay ply 28 has a width equal or greater than the maximum width of the crossed cord plies 26, encapsulating the crossed cord plies between the overlay ply 28 and the carcass reinforcing ply 12. The overlay ply 28 is reinforced with cords inclined at angles of 15° or less, preferably at 0°, relative to the equatorial plane EP of the tire.

In assembling the illustrated tire as a green tire, i.e. an uncured tire, the internal construction of the various reinforcing plies and sidewall inserts is symmetrical with respect to a center position of a building drum. Even after the green tire is expanded into a torodial configuration, prior to molding and curing of the tire, the tire has a symmetrical configuration about the green tire centerline. The green tire is cured in a mold having an asymmetrical configuration. After curing of the tire, due to the selected mold configuration, the tire has an asymmetric profile with respect to the tire equatorial plane EP. One tire half O is identified as the outboard side of the tire and the opposing tire half I is the inboard side of the tire; inboard and outboard sides I, O of the tire being relative to the mounting position of the tire on a vehicle.

The tire has a bead base line, B, along which the tire equatorial plane EP is positioned at a distance of ½ the length of the bead base line, the length of the bead base line B being measured from the axially outer surface of the bead areas 14, 16. The bead areas 14, 16 of the molded tire are symmetrical in configuration, thus, the location of the equatorial plane EP may also be determined from the distance between the axially and radially innermost locations of the bead areas 14, 16.

The outer surface of each tread half 30, 32 is characterized by different radii of curvature. The outboard side O of the tire is defined by not more than five radii of curvature, with the radius decreasing from the tread equatorial plane EP to the tread shoulder S'. This results in a tread profile with a more rounded shoulder for this tread half 32. The inboard side I of the tire is defined by continually, or smoothly, decreasing radii of curvature from the tread equatorial plane EP to the tread shoulder S. This results in a profile with a less rounded shoulder for this tread half 30.

The different curvatures results in each tread half 30, 32 having a different width Wt (inboard side I), Wt' (outboard side O) in the axial direction of the tire, as measured perpendicular to the equatorial plane EP, along a line E from the tire equatorial plane EP to line F or line F'. Line E is drawn perpendicular to the tire equatorial plane EP and tangent to the tread at the equatorial plane EP. Lines F (inboard side I) and F' (outboard side O) being tangent to one of the belt edges of the maximum width belt layer and parallel to the tire equatorial plane EP. The inboard tread half I has a width Wt in the range of 90 to 110% of the outboard tread half width Wt'.

The distance D, D' along lines F or F' from the surface of the tread to line E is also measured in each tread half 30, 32. The distance D, also known as the shoulder drop, is greater for the inboard side of the tire than the shoulder drop distance D' for the outboard tire side. The inboard shoulder drop D is in the range of 100 to 140% of the outboard shoulder drop D'.

Each tire sidewall has a maximum width Ws, Ws' as measured from the tire equatorial plane EP to the radially outer surface of the tire sidewall. Each sidewall half has a different maximum sectional width Ws, Ws'. The wider inboard sidewall maximum width Ws is in the range of 100 to 110% of the opposing outboard sidewall maximum width Ws'. Additionally, the radial height A, A', as measured from the bead base line B and parallel to the equatorial plane EP, of the maximum width Ws, Ws' of each sidewall differs. The small inboard radial height A is in the range of 80 to 100% of the greater outboard radial height A'. For the illustrated tire, the tire half having the greater maximum sectional width Ws, the inboard side, the maximum sectional width has a radial height A smaller in value than the radial height A' of the opposing outboard sidewall maximum sectional width Ws'. Thus, the inboard side of the tire has a greater cross sectional width, but at a radially lower position.

The profile of the tire as discussed above results in a tire having the inboard side of the tire being softer than the outboard side of the tire. In testing a sample tire, the load distribution of each sidewall was determined after vertically loading a mounted, uninflated tire at 350 kg; the tire was subject to 0 degree camber. The outboard side of the tire carried 64% of the load versus 34% of the load carried by the inboard side. Thus, the desired asymmetry was achieved.

All of the above discussed asymmetrical parameters, the different tread curvatures—as described by the combination of the two parameter ratios of the tread half width and shoulder drop (Wt/Wt' and D/D')—for each tread half, the different maximum sidewall widths Ws, Ws' for each tire half, and the different maximum sidewall width heights A, A', while shown all in a single tire embodiment, are independent of each other. Depending on the desired asymmetry of the tire, only one or several of the parameters may be formed asymmetrically while the remaining parameters are symmetrical.

A tire similar to the tire as illustrated in FIG. 1 was manufactured to determine the improvement in tire performance. A symmetrical green tire was formed, and molded in an asymmetrical mold to result in an asymmetrical tire cross-sectional profile. The tire has the following characteristics under inflation pressure with no load:

|  | Tread half width, mm | Shoulder drop, mm | Sidewall Maximum width, mm | Radial height, mm | Tread curvatures |
|---|---|---|---|---|---|
| Outboard | Wt' = 92.2 | D' = 12.2 | Ws' = 115.86 | A' = 44.0 | Multiple arc radius |
| Inboard | Wt = 92.2 | D = 15.5 | Ws = 118.00 | A = 38.40 | Continuous radius decrease |

Figure 2:
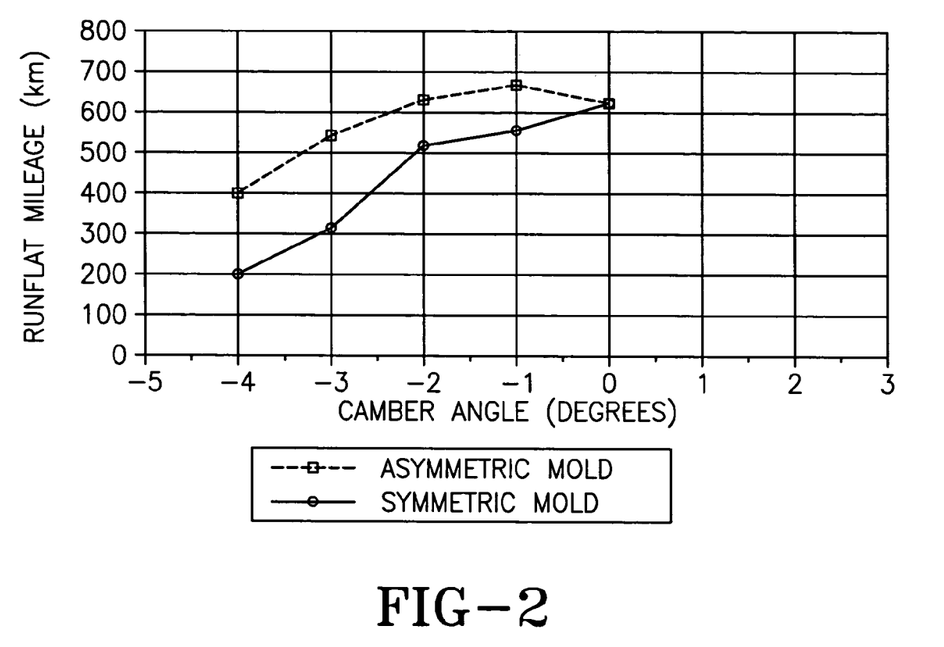
FIG. 2 is a graph of the results of tire testing under camber.

Another symmetrical green tire, identical in construction to the cured asymmetrical tire, was molded in a symmetrical mold. Both tires were mounted on a test wheel, subjected to different camber angles, and operated at zero inflation pressure to determine the run-flat mileage of the two tires. The results are shown in FIG. 2. For negative camber angles, the asymmetrical cured tire has greater durability than the symmetrical run-flat tire. The inventors use the SAE convention that negative camber means loading the inboard tire side.

The molding of the symmetrical green tire in an asymmetric mold to form an asymmetrical cured tire is just one method to achieve a run-flat tire with improved durability under high camber conditions. Alternative methods consist of molding an asymmetric green tire in a symmetrical mold or a combination of molding an asymmetrical green tire in an asymmetrical mold.

Figure 3:
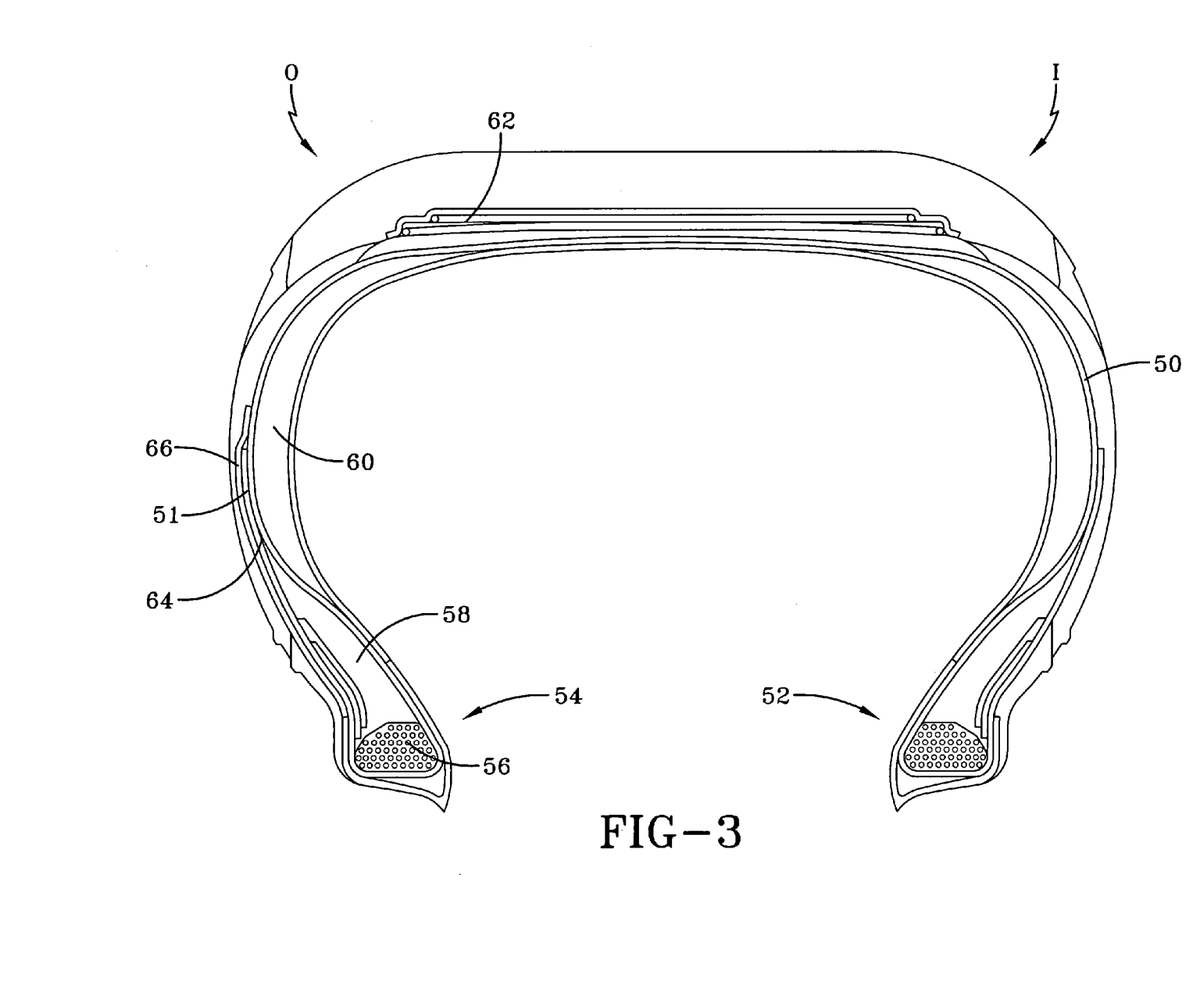
FIGS. 3-5 are cross sectional views of alternative embodiments of the tire.

FIG. 3 illustrates another asymmetrical run-flat tire in accordance with the present goal of improving the tire characteristics of a run-flat tire operated under camber conditions. The tire has a symmetrical profile in cross-section, as opposed to the asymmetrical profile tire of FIG. 1, the green tire being molded in a symmetrical mold. It has an inboard side I and an outboard side O. The tire carcass has at least one reinforcing ply 50, the ply 50 extending from one bead portion 52 of the tire to the opposing bead portion 54. Both ends of the ply 50 are turned axially inward to axially outward about bead cores 56 and bead apexes 58. When the tire is constructed with at least two plies 50, the innermost reinforcing ply has terminal ends that extend past the radially outer ends of the bead apexes 58 and the terminal ends of the outermost reinforcing ply; thereby enveloping the bead apexes 58 and other ply ends.

Axially inward of the reinforcing ply 50, and located in each sidewall region of the tire, is a sidewall insert 60. The inserts 60 are formed of elastomeric material and extend from the crown area, radially inward of the belt structure 62, to radially inward of the outermost terminal end 64 of the bead apexes 58, overlapping the bead apexes 58. The elastomeric material of the inserts 60 is selected to provide the tire with support during underinflated operation of the tire. However, to compensate for the camber values to which the tire will be subjected, the elastomer forming the insert 60 in one tire sidewall has different physical characteristics than from the elastomer forming the insert 60 in the opposing sidewall. Preferably, the insert 60 in the outboard sidewall O has a modulus of elasticity greater than the insert 60 in the inboard sidewall I.

To further modify the tire sidewall characteristics to offset the camber effects, the number of reinforcing plies in the outboard side bead portion 54 of the tire may be greater than the number of reinforcing plies in the opposing inboard bead portion 52. The at least one additional reinforcing ply 66 located in the outboard bead portion may be additional chafer, chipper, or flipper layers. The additional reinforcing ply 66 may or may be not be cord reinforced. If the reinforcing ply is not cord reinforced, the modulus of the ply 66 is distinct from the modulus of the plies or rubber layers (such as the sidewall layer) that surrounds the additional reinforcing ply 66. If the additional reinforcing ply 66 is cord reinforced, the cords are inclined at angles of 15° to 75° with respect to the circumferential direction of the tire. Alternatively, or in addition, the modulus of the reinforcing plies in the outboard bead portion 54 and/or sidewall may be greater than the modulus of the reinforcing plies in the opposing inboard bead portion 52 and/or sidewall. The greater modulus may be achieved by a greater modulus of the reinforcing cords in the reinforcing plies or a greater modulus of the coating compound of the reinforcing plies.

Alternatively, the additional reinforcing ply 66 may be a radial half carcass ply. The half carcass ply initiates at any location radially inward of the belt structure 62 and extends through the outboard sidewall and into the bead region 54. The half carcass may be directly adjacent to the main carcass reinforcement ply 50 and be turned up about the bead core 56 from axially inward of the bead core 56 to axially outward of the bead core 56. The half carcass may, alternatively, be directly adjacent only a portion of the main carcass reinforcement ply and then be directly adjacent the turn-up portion 51 of the main carcass reinforcement ply 50, with the radially inner end of the half carcass being turned about the bead core 56 from axially outwardly to the axially inwardly. The cords in the radial half carcass ply are inclined at an angle in the range of 75° to 90° relative to the circumferential direction of the tire.

Figure 4:
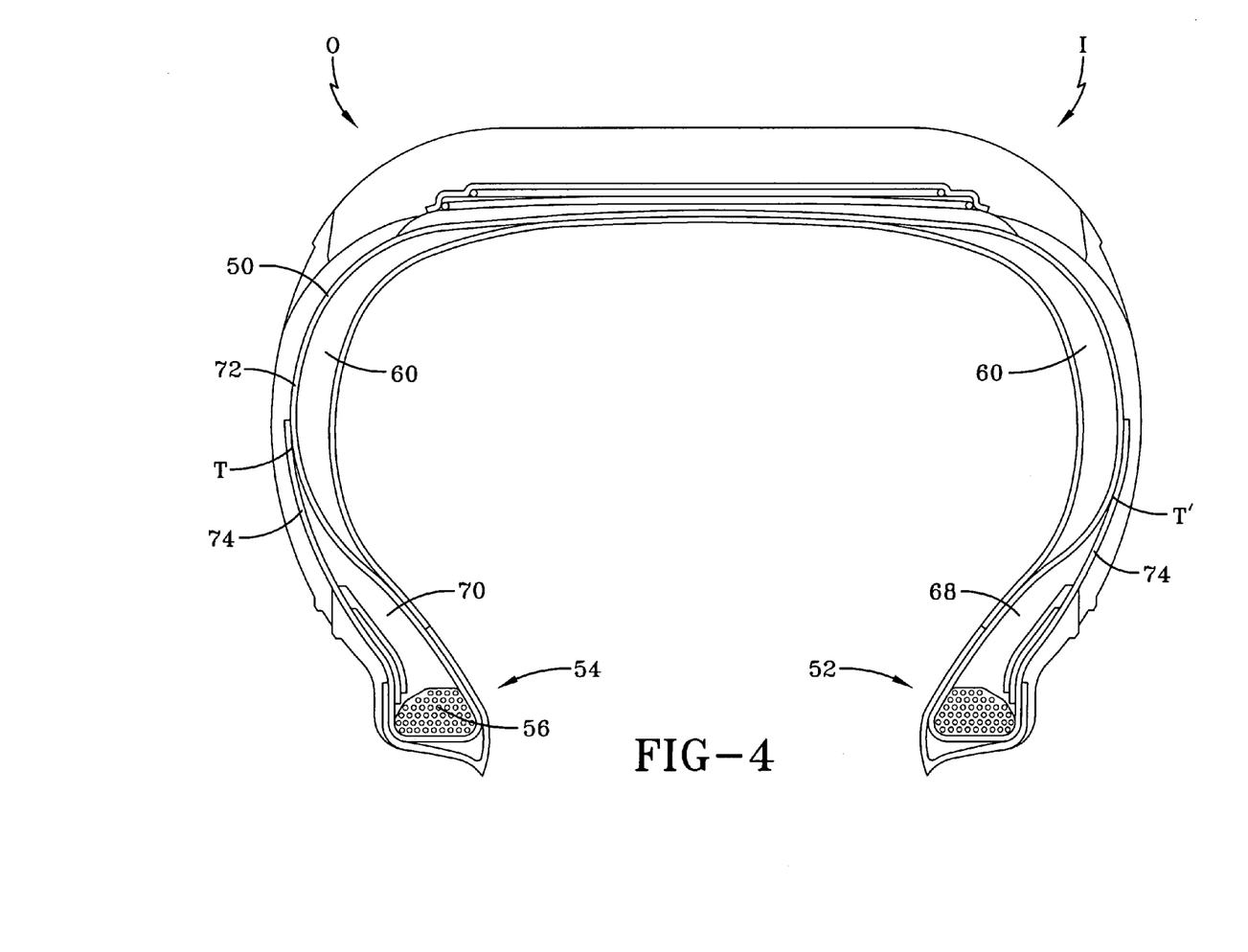

Another method of modifying the tire construction to achieve the desired asymmetrical nature of the run-flat tire is illustrated in FIG. 4. The run-flat tire has a symmetrical profile in cross-section and has an inboard side I and an outboard side O. In the bead portion 52, 54 of each sidewall, between the main portion 72 of the carcass reinforcing ply 50 and the turn-up portions 74 of the carcass reinforcing plies 50, is the bead core 56 and a bead apex 68, 70. The apex 68, 70 is formed of elastomeric material and has a wedge-like shape to maintain a spacing between the main 72 and turn-up portions 74 of the carcass reinforcing ply 50. The apex 70 in the outboard side O of the tire has a terminal, or end, point T radially outward of the terminal point T' of the apex 68 in the inboard side I of the tire. This results in the outboard side O of the tire have a greater strength or stiffness than the inboard side I of the tire.

Alternatively, or in addition, the greater strength in one side of the tire may be achieved by forming the apex 70 in the outboard side O of the tire from a greater modulus material than the material used for the apex 68 in the opposing, inboard side I of the tire.

Figure 5:
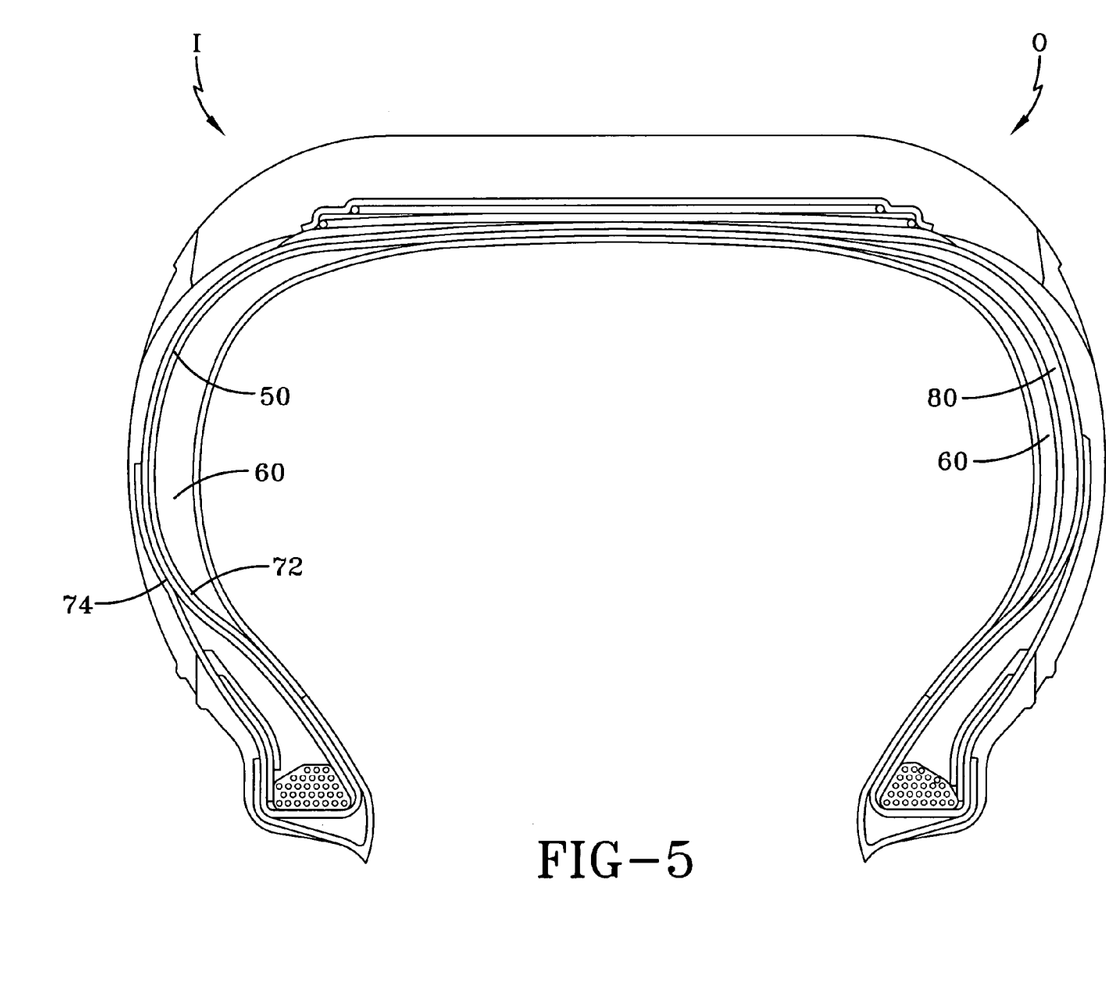

Alternatively, or in addition, the additional strength material in the outboard sidewall may be provided by an additional insert 80 that is not provided in the opposing sidewall, see FIG. 5. The additional insert 80 may be located between the main 72 and turn-up portions 74 of the reinforcing plies 50, between the main portions 72 of adjacent reinforcing plies 50, or axially outward of the turn-up portion 74 of the carcass reinforcing plies 50.

Any of the above disclosed variations creating an asymmetric tire with respect to the strength of each tire half may be combined amongst themselves or with any or all of the profile varying features disclosed in the tire of FIG. 1.

What is claimed is:

1. An asymmetric run-flat pneumatic tire, the tire having an equatorial plane (EP), a pair of opposing bead portions, a pair of opposing sidewalls, at least one carcass reinforcing plies, a sidewall insert axially inward of at least one of the carcass reinforcing plies in each sidewall portion, and a belt structure located radially outward of the carcass reinforcing plies, the tire being characterized by:

the bead portions being symmetrically distanced from the equatorial plane (EP) of the tire, and the tread on each side of the equatorial plane (EP) having different radius of curvature and different widths with the tread curvature on one side of the equatorial plane (EP) defined by continually decreasing radii of curvature, the widths being measured perpendicular to the equatorial plane (EP) to a line tangent to the maximum width of the belt structure.

2. The tire of claim 1 wherein each sidewall of the tire has a maximum width, as measured from the tire equatorial plane to the radially outer surface of the tire sidewall, and one sidewall has a width Ws greater than the width Ws' of the opposing sidewall.

3. The tire of claim 2 wherein one sidewall has a width Ws in the range of 100 to 110% of the width Ws' of the opposing sidewall.

4. The tire of claim 1 wherein a distance D or D', measured along a line F or F' tangent to the belt edge of the maximum width belt layer and parallel to the tire equatorial plane EP, from the radially outer surface of the tread to a line E perpendicular to the tire equatorial plane EP and tangent to the tread at the equatorial plane EP, is greater on one side of the tire than the distance D' or D on the opposing side of the tire.

5. The tire of claim 4 wherein the ratio of the distances D, D' is in the range of 100 to 140%.

6. The tire of claim 1, wherein each sidewall of the cured tire has a maximum width, as measured from the tire equatorial plane to the radially outer surface of the tire sidewall, and the maximum width of one sidewall is radially outward of the maximum width of the opposing sidewall.

7. The tire of claim 6, wherein the radial height of the maximum width of one sidewall, as measured from a bead base line of the tire, is in the range of 80 to 100% of the radial height of the maximum width of the opposing sidewall.

8. The tire of claim 1, the tire further characterized by the sidewall insert in one sidewall has different physical characteristics than the sidewall insert in the opposing sidewall.

9. The tire of claim 1, the tire further characterized by the tire comprising an additional reinforcing layer located in only one bead portion, the additional reinforcing layer selected from the group consisting of a chafer, chipper, flipper, or radial half carcass ply.

10. The tire of claim 1, the tire further characterized by one sidewall having two sidewall inserts and the opposing sidewall having only one sidewall insert.

11. The tire of claim 1, the tire being further characterized by each bead portion comprising a bead core and an apex, the apex being located radially outward of the bead core and having a radially outward terminal point, wherein the terminal point of the apex in one bead portion is radially outward of the terminal point of the apex in the opposing bead portion.

12. The tire of claim 1, the tire further characterized by each bead portion comprising a bead core and an apex, the apex being located radially outward of the bead core, wherein, the apex in one bead portion has different physical characteristics than the apex in the opposing bead portion.

* * * * *